US009729393B2

(12) United States Patent
Maetz et al.

(10) Patent No.: US 9,729,393 B2
(45) Date of Patent: Aug. 8, 2017

(54) DEVICE AND A METHOD AT THE DEVICE FOR CONFIGURING A WIRELESS INTERFACE

(71) Applicant: THOMSON LICENSING, Issy de Moulineaux (FR)

(72) Inventors: Pascal Maetz, Montgermont (FR); Ludovic Jeanne, Montreuil sur Ille (FR); Christophe Vidon, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/411,507

(22) PCT Filed: Jun. 28, 2013

(86) PCT No.: PCT/EP2013/063697
§ 371 (c)(1),
(2) Date: Dec. 28, 2014

(87) PCT Pub. No.: WO2014/001534
PCT Pub. Date: Jan. 3, 2014

(65) Prior Publication Data
US 2015/0156063 A1  Jun. 4, 2015

(30) Foreign Application Priority Data
Jun. 29, 2012 (EP) .................... 12305770

(51) Int. Cl.
*H04L 12/24* (2006.01)
*H04L 12/28* (2006.01)
(Continued)

(52) U.S. Cl.
CPC ...... *H04L 41/0803* (2013.01); *H04L 12/2838* (2013.01); *H04W 48/20* (2013.01);
(Continued)

(58) Field of Classification Search
CPC ............ H04L 41/0803; H04L 12/2838; H04L 2012/2841; H04W 48/20; H04W 76/025; H04W 88/04
(Continued)

(56) References Cited

U.S. PATENT DOCUMENTS

| 7,342,899 B2 | 3/2008 | Suetsugu |
| 7,359,339 B2 * | 4/2008 | Benson ............... H04L 41/0816 370/244 |

(Continued)

FOREIGN PATENT DOCUMENTS

| EP | 2387264 | 11/2011 |
| WO | WO2011085073 | 7/2011 |

OTHER PUBLICATIONS

Search Report Dated Oct. 25, 2013.

*Primary Examiner* — Candal Elpenord
*Assistant Examiner* — Syed M Bokhari
(74) *Attorney, Agent, or Firm* — Myers Wolin LLC

(57) ABSTRACT

The present invention concerns a device comprising a first network interface, a wireless network interface and a network configuration module adapted to configure the wireless network interface, so that, when the wireless network interface is disabled, if the device is connected to a second device through the first network interface, the second device comprising a wireless access point interface compatible with the wireless network interface, configuring the wireless network interface into a wireless access point mode of operation, and if the device is not connected to the second device through the first network interface, configuring the wireless network interface into a wireless client mode of operation and connecting the wireless network interface to the wireless access point interface.

13 Claims, 4 Drawing Sheets

(51) Int. Cl.
*H04W 48/20* (2009.01)
*H04W 88/04* (2009.01)
*H04W 76/02* (2009.01)

(52) U.S. Cl.
CPC ... *H04L 2012/2841* (2013.01); *H04W 76/025* (2013.01); *H04W 88/04* (2013.01)

(58) Field of Classification Search
USPC .................................... 370/386, 254, 225
See application file for complete search history.

(56) References Cited

U.S. PATENT DOCUMENTS

| | | | |
|---|---|---|---|
| 7,839,771 B2* | 11/2010 | Zeng ................... | H04W 24/04 370/225 |
| 7,933,247 B2 | 4/2011 | Gidwani | |
| 2002/0031120 A1* | 3/2002 | Rakib .............. | G08B 13/19656 370/386 |
| 2004/0158649 A1* | 8/2004 | Ophir ................. | H04L 12/2801 709/250 |
| 2008/0170527 A1 | 7/2008 | Lundsgaard et al. | |

* cited by examiner

DEVICE AND A METHOD AT THE DEVICE FOR CONFIGURING A WIRELESS INTERFACE

This application claims the benefit, under 35 U.S.C. §365 of International Application PCT/EP2013/063697, filed Jun. 28, 2013, which was published in accordance with PCT Article 21(2) on Jan. 3, 2014 in English and which claims the benefit of European patent application No. 12305770.5, filed Jun. 29, 2012.

FIELD OF THE INVENTION

The present invention relates generally to the interconnection of devices and in particular to the configuration of a wireless interface.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A residential network or home network is set of digital device communicating in a local area network. It usually comprises a variety of electronic devices that may be interconnected through various network technologies, either wired or wireless. It may comprise among others computers, printers, mobile devices, television decoder or television set. It usually comprises a gateway providing Internet access through a broadband connection. A decoder, also called a set-top box, is adapted to receive content from a server generally located outside the residential network. In particular, a decoder may receive content from a server device located in the Internet. The decoder accesses the Internet through a residential gateway. It is generally connected to the gateway through a wired link that provides a good transmission quality. However, transmission quality of some wireless technologies is sufficient today to permit reliable transmissions. In particular, in some home environments, it is possible to wirelessly connect a decoder to a gateway. Of course in some configurations, it is known that wireless transmission may not be reliable enough and a wired link is preferred. In general the gateway comprises a wireless access point module that allows wireless stations to connect to the residential wired network and to the Internet.

The residential network may comprise several decoders. In particular the decoders may be connected to a same content provider and provide the multi-room function where a decoder is the master and the other ones are slaves. A slave decoder is connected through the master decoder to access the content provider services. Decoders are interconnected through home network technologies, either wired or wireless. Most decoders now contain a Wi-Fi module. Slaves contain a Wi-Fi client module to connect to the master having a Wi-Fi access point module. When the wireless transmission quality is too low for video transmission, a wired connection is required between the client and the master. More generally, the client located close to the master may be wirelessly connected to the master, and the clients located too far away from the master have to use a wired link to connect to the master. This is not convenient because it requires setting up a wired network in the home environment to enable reliable transmissions between the master and all client devices located far away from the master.

SUMMARY OF THE INVENTION

The present invention attempts to remedy at least some of the concerns connected with the interconnection of devices in the prior art, by avoiding an end user to set up a wired network in the home environment.

The present invention concerns a network device able to solve the problems of easy set-up of a residential network. The network device permits to easily expand the wireless coverage in a residential network. It applies notably to the field of local network comprising wired and wireless connections.

To this end, the invention relates to a device comprising a first network interface and a wireless network interface. According to the invention, the device comprises a network configuration module adapted to configure the wireless network interface, so that, when the wireless network interface is disabled, if the device is connected to a second device through the first network interface, the second device comprising a wireless access point interface compatible with the wireless network interface, configuring the wireless network interface into a wireless access point mode of operation, and if the device is not connected to the second device through the first network interface, configuring the wireless network interface into a wireless client mode of operation, and connecting the wireless network interface to the wireless access point interface.

Thus, the invention permits to easily extend the wireless coverage in a home environment. It has the advantage of facilitating the connection of devices without having to necessarily use a wired network and its drawback. In addition, the invention permits to use the wireless interface of a device, although it is not used to access the server. The easy configuration enables any end user to set up the wireless network.

According to an embodiment of the invention, the device is connected to a second device through the first network interface when, after sending a request to a server through the first network interface, it receives a response from the server.

According to an embodiment of the invention, the device comprises an application that starts when the device is connected to the server.

According to an embodiment of the invention, the application is a decoder.

According to an embodiment of the invention, the first network interface is an Ethernet interface or a coaxial cable interface.

According to a variant embodiment, the invention is a method in a device comprising a first network interface and a wireless network interface, comprising the steps of, when the wireless network interface is disabled, if the device is connected to a second device through the first network interface, the second device comprising a wireless access point interface compatible with the wireless network interface, configuring the wireless network interface into a wireless access point mode of operation, and if the device is not connected to the second device through the first network interface, configuring the wireless network interface into a wireless client mode of operation and connecting the wireless network interface to the wireless access point interface.

Another object of the invention is a computer program product comprising program code instructions for executing the steps of the method according to the invention, when that program is executed on a computer. By "computer program product", it is meant a computer program support, which may consist not only in a storing space containing the program, such as a computer memory, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 3, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

The exemplary embodiment comes within the framework of a residential environment, but the invention is not limited to this particular environment and may be applied within other frameworks where devices may be connected though multiple means.

Figure 1:
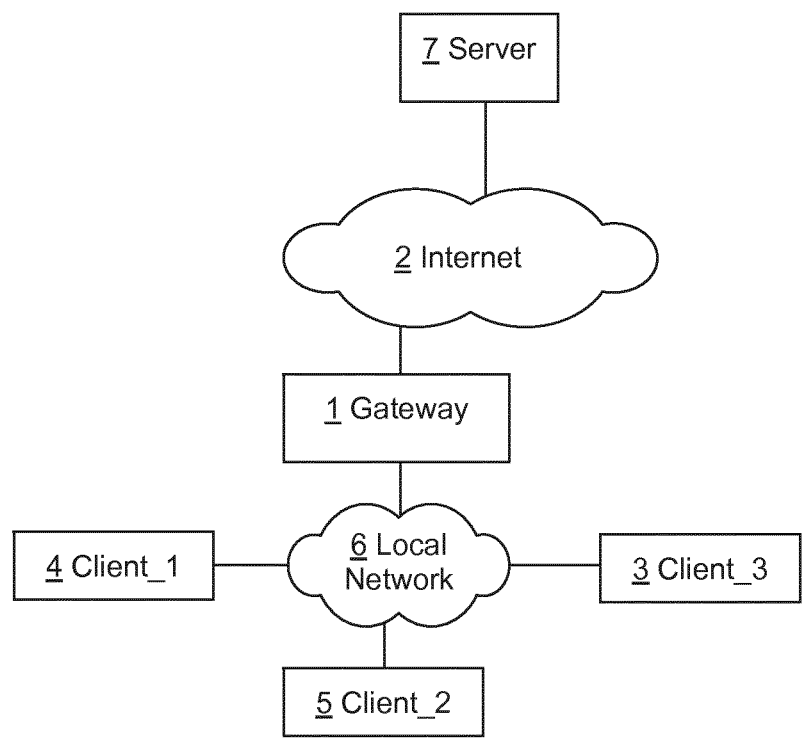
FIG. 1 is a block diagram of a system compliant with the embodiment.

A system according to the embodiment is represented in FIG. 1. It comprises three client devices 3, 4, 5 and a server 7 connected through the Internet 2. The client devices are located in a local network 6 connected to the Internet through a gateway device 1. The local network is a residential network. The gateway device is adapted to connect the residential network provide to the Internet through a broadband access. In particular the client devices 3, 4, 5 are set-top boxes that receive audio-video content from a content provider over the Internet from the server 7. Of course they could receive content from more than one server. An example of such a set-top box device is the DXI807 from Technicolor.

Figure 2:
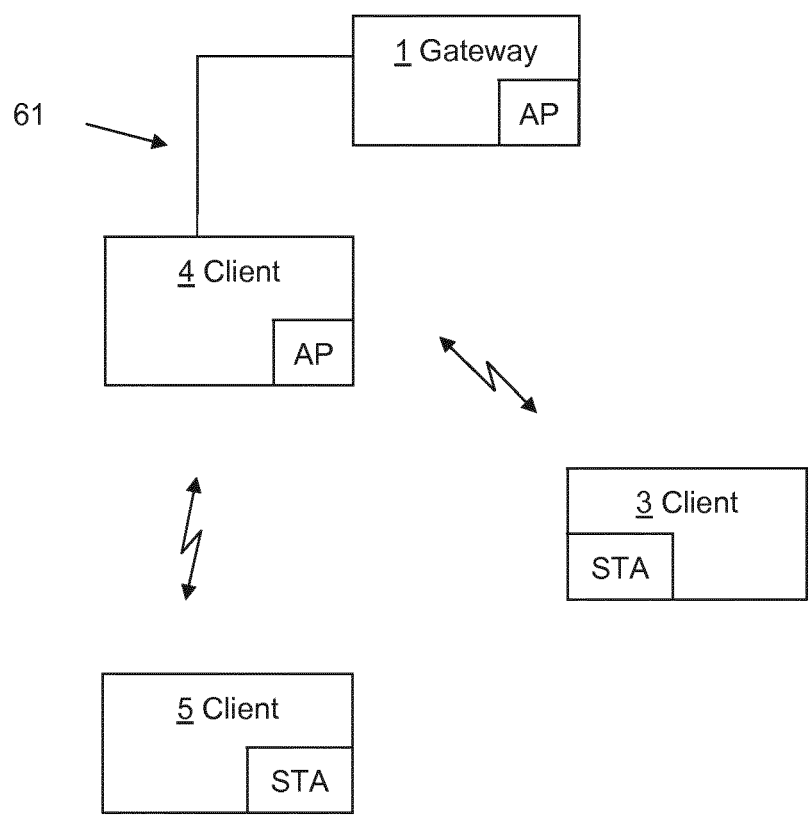
FIG. 2 illustrates a set of devices in a residential network according to the embodiment.

The local network may use any combination of wired or wireless technologies well known to the skilled in the art, in part or totally, to interconnect local devices. As illustrated in the exemplary embodiment of FIG. 2, the client 4 is connected to the gateway with an Ethernet connection. The client 3 is connected to the gateway with a wireless connection, and the client 5 is connected to the client 4 with a wireless connection. In particular, the client 5 cannot connect wirelessly to the gateway because it is located too far from the gateway. However, it can connect wirelessly to the client 4 to access the gateway. The gateway device 1 comprises an Ethernet connection and a wireless connection. The wireless interface of the gateway is an IEEE802.11n compliant access point.

Figure 3:
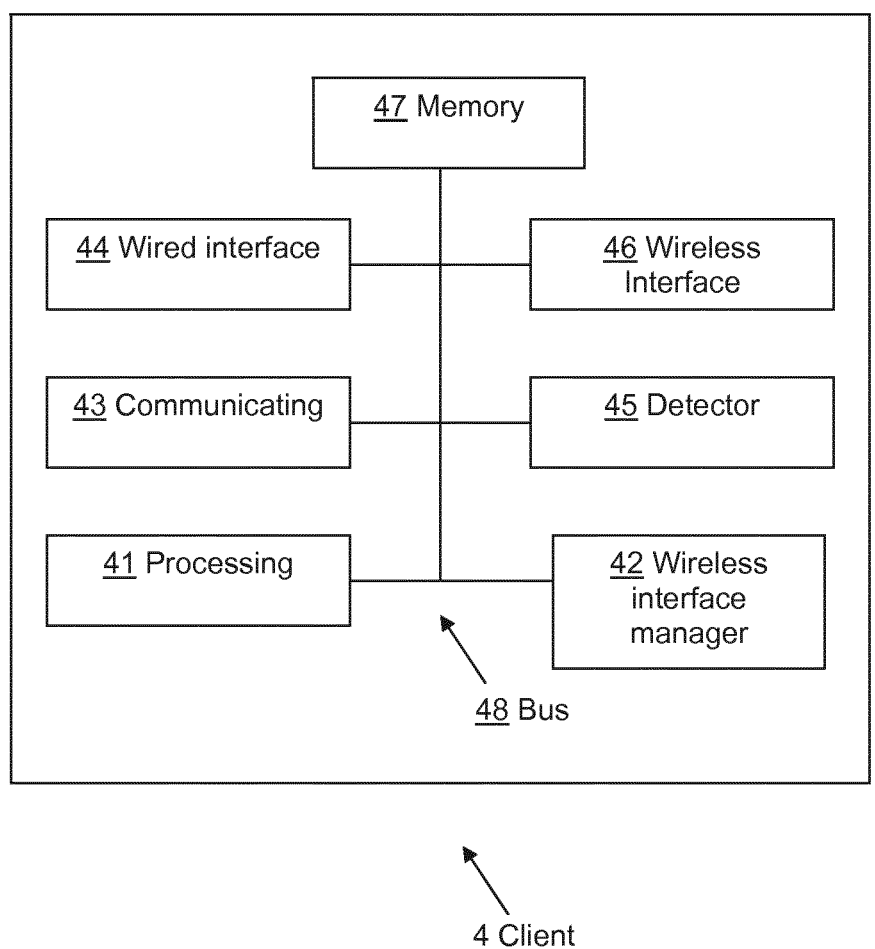
FIG. 3 is a block diagram of a client device compliant with the embodiment.

The client device 4 is further illustrated in FIG. 3. According to the embodiment the client device is a set-top box. The modules illustrated in FIG. 3 are the ones relevant to the embodiment of the invention. The client device comprises a wired interface 44 such as an Ethernet interface. Of course it could be any wired interface that can be used to connect a set-top box to a gateway in a local network. For example it could be an interface compliant with power line communication standards. It could also be an interface compliant with coaxial cable standards, as promoted by the Multimedia over Cable Alliance, noted MoCa.

The client device also comprises a wireless interface 46 compliant to the IEEE802.11n standard. Of course the wireless interface could be of any wireless network technology that enables to connect a set-top box to a gateway in a local network. The wireless interface may be set either to an IEEE802.11n compliant access point or an IEEE802.11n compliant station.

The client device comprises a detector 45 adapted to check if the server 7 is accessible. In particular it is adapted to check if a service provided by the server is available. The detector 45 is usually present in any decoder.

The client device also comprises a wireless interface manager 42, noted WIM hereinafter, that is adapted to configure the wireless interface 46. In particular it configures the wireless interface either into an access point or a station, according to decision criteria as illustrated in the flow chart of FIG. 4.

Figure 4:
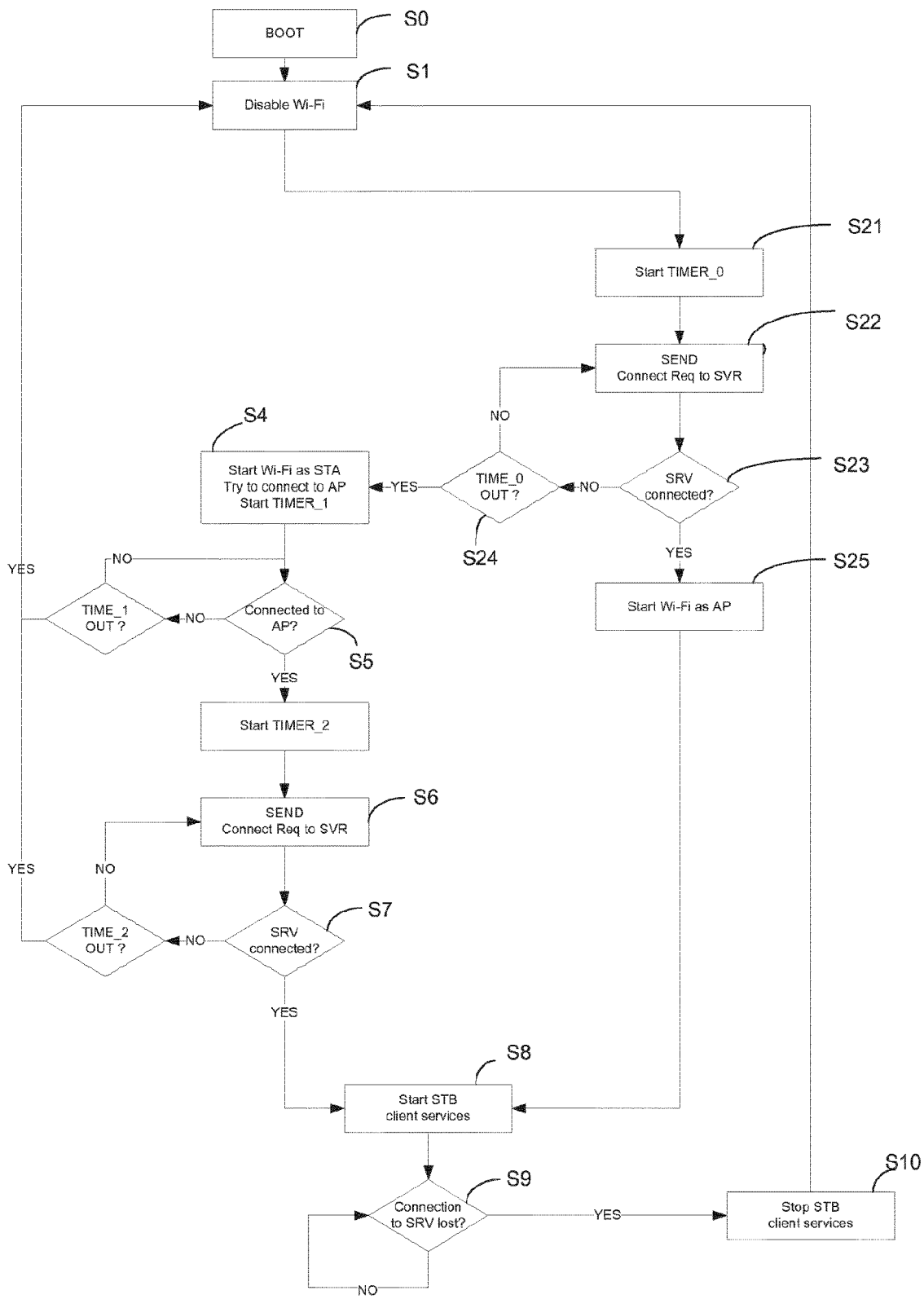
FIG. 4 is a flow chart of a wireless manager compliant with the embodiment.

As illustrated in FIG. 4, the wireless configuration starts at step S0, where the device 4 boots up. At steps S1, the wireless interface is disabled; which means it is not activated or in other words it does not consume power. The WIM then checks whether the client 4 is connected to the server. The detector 45 starts a timer at step S21, and it sends a request to connect to the server at step S22. If the detector receives a response from the server, at step S23, this means that the client is connected to the server. The WIM is informed by the detector either with an interruption signal from the detector or by accessing a register in memory that indicates the presence of a server, in a manner well known to the skilled in the art. When a server has been detected, the WIM configures the wireless interface as a Wi-Fi access point function and it starts the Wi-Fi access point function, at step S25. As the client is connected to the server, the decoder client service is then started, at step S8.

If no connection to the server is detected, at step S23, and a Time_0 Out occurs, at step 24, the WIM configures the wireless interface as a Wi-Fi station function, at step S4. After being started, the Wi-Fi station tries to connect to the gateway Wi-Fi access point, at step S4. When it is connected to the access point, the WIM then checks if the service is accessible through the wireless link. The detector sends a request to a server, at step S6. If it receives a response, at step S7, this means that the client is connected to the server. And the decoder client service is then started, at step S8.

If it does not receive any response, at step S7, and the Time_2 Out occurs at step S7, the Wi-Fi interface is disabled, step S1.

While the decoder client services are active, the WIM regularly checks whether the decoder is still connected to the server, at step S9. When the connection is disabled, the decoder client services are stopped, at step S10, and the Wi-Fi interface is disabled, step S1.

Preferably, when the connection to the server is disabled, the WIM first checks whether the connection to the gateway is active. If it is inactive, the Wi-Fi interface is disabled, step S1. If it is still active, the client tries to connect to the server.

As illustrated, to configure the wireless interface, the client checks whether it is connected to the server. Of course, it could alternatively check whether it is connected to the gateway device 1, in a manner well know per se. If connected while the wireless interface is disabled, the client configures the wireless interface as a Wi-Fi access point function. If not connected, it configures the wireless interface as a Wi-Fi station function. The configuration of the wireless interface is there independent of the connection to a server. The wireless interface is configured whether the server is accessible or not. The client can then use the wireless interface as a wireless repeater in the home environment, even if the decoder service is not enabled.

Alternatively, the connection to the gateway and to the server could be both verified before configuring the wireless interface. This would enable to check that the server is accessed through the gateway device and not through another device.

As illustrated, when some timers expire or when the connection to the gateway is lost, the Wi-Fi connection is disabled, at step S1. Alternatively, a notification message appears on the device user interface to indicate that the connection could not be set up. And the wireless interface configuration is terminated. This permits to avoid an endless configuration algorithm. In this case the user interface offers the possibility to the end user to restart the wireless configuration algorithm.

As indicated in step S25, the wireless interface may be set to a Wi-Fi Access Point function. The Access Point may be set into any configuration that enables another wireless client 3, 5 to connect to it to access the server. Of course, the Access Point could also be put into the same configuration as the gateway Access Point, as is well known to the skilled in the art. In particular the access point could use the same service set identification, SSID, parameter as the gateway Access Point. The SSID is defined in the IEE802.11 specification. This would enable roaming between the Access Points.

The service is provided by a server that is located outside the local network. Of course, the server could alternatively be located in the local network either in the gateway or in a set-top box.

In a variant, the client device 4 is a master set-top box and the client devices 3, 5 are slave set-top boxes.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A device comprising: a first wired network interface; a wireless network interface; wireless interface manager to: when said wireless network interface is disabled, the wireless interface manager sends a request to connect to a second device and upon receiving a response that the device is connected to the second device through the first wired network interface, the wireless interface manager configures the wireless network interface into a wireless access point mode of operation; and when detected that the device is not connected to the second device through the first wired network interface, the wireless interface manager configures the wireless network interface into a wireless client mode of operation and connects said wireless network interface to a wireless access point located in the second device.

2. The device according to claim 1, wherein the wireless interface manager is further configured to connect to the second device through the first wired network interface if, after sending a request to a server through said first wired network interface, the wireless interface manager detects a response from said server.

3. The device according to claim 1, wherein the wireless interface manager is further configured to execute an application that starts when said device is connected to a server.

4. The device according to claim 3, wherein said application is a decoder.

5. The device according to claim 1, wherein said first wired network interface is an Ethernet interface or a coaxial cable interface.

6. The device according to claim 1, wherein the wireless access point of said device is configured with a service set identification that is identical to that of the wireless access point located in the second device.

7. A method in a device comprising a first wired network interface, a wireless network interface and a wireless interface manager, the method comprising: when said wireless network interface is disabled, the wireless interface manager sends a request to connect to a second device and upon receiving a response that the device is connected to the second device through the first wired network interface, the wireless interface manager configures, by the wireless interface manager, the wireless network interface into a wireless access point mode of operation; and when detected that the device is not connected to the second device through the first wired network interface, configuring, by the wireless interface manager, the wireless network interface into a wireless client mode of operation and connecting, by the wireless interface manager, said wireless network interface to a wireless access point located in the second device.

8. The method according to claim 7, further comprising connecting, by the wireless interface manager, to the second device through the first wired network interface when, after sending a request to a server through said first wired network interface, a response from said server is detected by the wireless interface manager.

9. The method according to claim 7, further comprising executing, by the wireless interface manager, an application that starts when said device is connected to a server.

10. The method according to claim 9, wherein said application is a decoder.

11. The method according to claim 7, wherein said first wired network interface is an Ethernet interface or a coaxial cable interface.

12. The method according to claim 7, wherein the wireless access point of said device is configured with a service set identification that is identical to that of the wireless access point located in the second device.

13. A non-transitory computer-readable medium with instructions stored therein which upon execution instruct at least one processor in a device to: when said wireless network interface is disabled, the wireless interface manager sends a request to connect to the second device and upon receiving a response that the device is connected to a second device through a first wired network interface, the wireless interface manager configures the wireless network interface into a wireless access point mode of operation; and when detected that the device is not connected to the second device through the first wired network interface, configuring, by the wireless interface manager, the wireless network interface into a wireless client mode of operation and connecting, by the wireless interface manager, said wireless network interface to a wireless access point located in the second device.

* * * * *